(12) United States Patent
Zhang

(10) Patent No.: US 12,487,919 B2
(45) Date of Patent: Dec. 2, 2025

(54) ELECTRONIC DEVICE AND OPERATION METHOD THEREOF, AND SYSTEM

(71) Applicant: YANGTZE MEMORY TECHNOLOGIES CO., LTD., Wuhan (CN)

(72) Inventor: Feiyang Zhang, Wuhan (CN)

(73) Assignee: Yangtze Memory Technologies Co., Ltd., Hubei (CN)

( * ) Notice: Subject to any disclaimer, the term of this patent is extended or adjusted under 35 U.S.C. 154(b) by 40 days.

(21) Appl. No.: 18/426,088

(22) Filed: Jan. 29, 2024

(65) Prior Publication Data

US 2025/0103484 A1    Mar. 27, 2025

(30) Foreign Application Priority Data

Sep. 27, 2023   (CN) .......................... 202311273046.6

(51) Int. Cl.
*G06F 12/02*      (2006.01)
(52) U.S. Cl.
CPC .............. *G06F 12/0246* (2013.01)

(58) Field of Classification Search
CPC .................................................. G06F 12/0246
See application file for complete search history.

(56) References Cited

U.S. PATENT DOCUMENTS

| | | | |
|---|---|---|---|
| 2003/0229752 A1* | 12/2003 | Venkiteswaran ... | G06F 12/0638 711/170 |
| 2016/0064036 A1* | 3/2016 | Chen ...................... | H04N 7/185 386/241 |
| 2019/0369876 A1* | 12/2019 | Gaskill ............... | G06F 12/0246 |
| 2020/0371940 A1* | 11/2020 | Navon ................ | G06F 12/0868 |
| 2020/0379668 A1* | 12/2020 | Akaike .................. | G06F 3/067 |

* cited by examiner

*Primary Examiner* — Masud K Khan
(74) *Attorney, Agent, or Firm* — Conley Rose, P.C.

(57) ABSTRACT

Examples of the present disclosure provide an operation method, comprising: sending, by a memory system comprising a memory controller, an index value, the index value being stored in the memory controller; and receiving, by a host system coupled to the memory system and comprising a host storage unit, the index value and obtaining serial port information corresponding to the index value based on the index value, the serial port information being stored in the host storage unit, and wherein a storage capacity occupied by the index value is smaller than a storage capacity occupied by the serial port information.

20 Claims, 12 Drawing Sheets

ELECTRONIC DEVICE AND OPERATION METHOD THEREOF, AND SYSTEM

CROSS-REFERENCE TO RELATED APPLICATIONS

The present application claims priority to Chinese Patent Application No. 2023112730466, which was filed Sep. 27, 2023, is titled "ELECTRONIC EQUIPMENT AND ITS OPERATING METHOD, MEMORY SYSTEM, STORAGE MEDIUM," and is hereby incorporated herein by reference in its entirety.

TECHNICAL FIELD

The present disclosure relates to the field of semiconductor technologies, and in particular, to an electronic device and an operation method thereof, a memory system, and a storage medium.

BACKGROUND

With the advancement of computer application technologies, electronic devices in related art generally have a log function, and a large amount of serial port information is stored in the log file of the electronic devices to record the operation condition of the device. Maintenance personnel can gain insight to the operation status and abnormal problems of the device based on the serial port information.

However, as people's requirements for electronic devices continue to increase, there are still many problems regarding the log function of electronic devices that need to be solved.

SUMMARY

In view of this, examples of the present disclosure provide an electronic device and an operation method thereof, a memory system, and a storage medium. The examples of the present disclosure provide an electronic device comprising a host system and a memory system coupled to the host system. The memory system comprises a memory controller, and the host system comprises a host storage unit. Examples of the present disclosure provide an operation method of an electronic device, comprising: sending, by the memory system, an index value, the index value being stored in the memory controller; and receiving, by the host system, the index value and obtaining serial port information corresponding to the index value based on the index value, the serial port information being stored in the host storage unit, and wherein a storage capacity occupied by the index value is smaller than a storage capacity occupied by the serial port information.

In some examples, the obtaining serial port information corresponding to the index value based on the index value comprises: obtaining the serial port information corresponding to the index value based on the index value in combination with a mapping table, and wherein the mapping table comprises all serial port information and index values corresponding to all the serial port information, and the mapping table is stored in the host storage unit.

In some examples, the memory system further comprises a memory device coupled to the memory controller, and the operation method further comprises: before sending the index value by the memory system, obtaining, by the host system, all the serial port information in the memory device and setting the index values corresponding to all the serial port information; and establishing the mapping table based on all the serial port information and the index values corresponding to all the serial port information.

In some examples, the index values correspond to the serial port information one-by-one.

In some examples, the sending, by the memory system, an index value comprises: sending the index value when an abnormality occurs in the memory system.

An example of the present disclosure also provides an electronic device. The electronic device comprises: a host system and a memory system coupled to the host system, the memory system comprising a memory controller, and the host system comprising a host storage unit, wherein the memory system is configured to send an index value, the index value being stored in the memory controller; and the host system is configured to receive the index value and obtain corresponding serial port information based on the index value, the serial port information being stored in the host storage unit, and wherein a storage capacity occupied by the index value is smaller than a storage capacity occupied by the serial port information.

In some examples, the host system is configured to: obtain the serial port information corresponding to the index value based on the index value in combination with a mapping table, and wherein the mapping table comprises all serial port information and index values corresponding to all the serial port information, and the mapping table is stored in the host storage unit.

In some examples, the memory system further comprises a memory device coupled to the memory controller, and the host system is further configured to: before sending the index value by the memory system, obtain all the serial port information in the memory device and set the index values corresponding to all the serial port information; and establish the mapping table based on all the serial port information and the index values corresponding to all the serial port information.

In some examples, the index values correspond to the serial port information one-by-one.

In some examples, the memory system is further configured to: send the index value when an abnormality occurs in the memory system.

An example of the present disclosure also provides a memory system coupled to a host system and comprising a memory controller configured to: send an index value, the index value being stored in the memory controller and corresponding to serial port information stored in the host system, and wherein a storage capacity occupied by the index value is smaller than a storage capacity occupied by the serial port information.

Examples of the present disclosure further provide a memory system coupled to a host system and comprising: a memory controller and a memory device coupled to the memory controller, wherein the memory controller is configured to send an index value, the index value being stored in the memory controller; the memory device is configured to: receive the index value and determine serial port information corresponding to the index value based on the index value; and send the serial port information to the memory controller, the serial port information being stored in the memory device, and wherein the memory controller is further configured to: receive the serial port information; and send the serial port information to the host system.

In some examples, the memory device is configured to: obtain the serial port information corresponding to the index value based on the index value in combination with a mapping table, and wherein the mapping table comprises all serial port information and index values corresponding to all the serial port information, and the mapping table is stored in the memory device.

Examples of the present disclosure also provide a storage medium storing therein executable instructions that, when executed by an electronic device, can implement the operations of the operation method of the electronic device according to the above examples of the present disclosure.

Examples of the present disclosure provide an electronic device and an operation method thereof, a memory system, and a storage medium. The electronic device comprises a host system and a memory system coupled to the host system. The memory system comprises a memory controller, and the host system comprises a host storage unit. The operation method comprises: sending, by the memory system, an index value, the index value being stored in the memory controller; and receiving, by the host system, the index value and obtaining serial port information corresponding to the index value based on the index value, the serial port information being stored in the host storage unit, and wherein a storage capacity occupied by the index value is smaller than a storage capacity occupied by the serial port information. In the examples of the present disclosure, the storage capacity occupied by the index value is smaller than the storage capacity occupied by the serial port information corresponding to the index value. Therefore, by storing the serial port information in the host storage unit and storing the index value corresponding to the serial port information in the memory controller, the memory controller only needs to send the index value corresponding to the serial port information to the host system when the memory controller needs to feed back serial port information to the host system, and the host system obtains the corresponding serial port information from the host storage unit based on the index value. In this way, one the one hand, since the storage capacity occupied by the index value sent to the host system by the memory controller is less, the amount of data sent to the host system by the memory controller is reduced, which saves the data transmission time and is conducive to improving the data transmission efficiency. On the other hand, storing the index value in the memory controller saves the storage space of the memory controller and improves the memory resource utilization of the memory controller compared to storing the serial port information in the memory controller.

Figure 1:
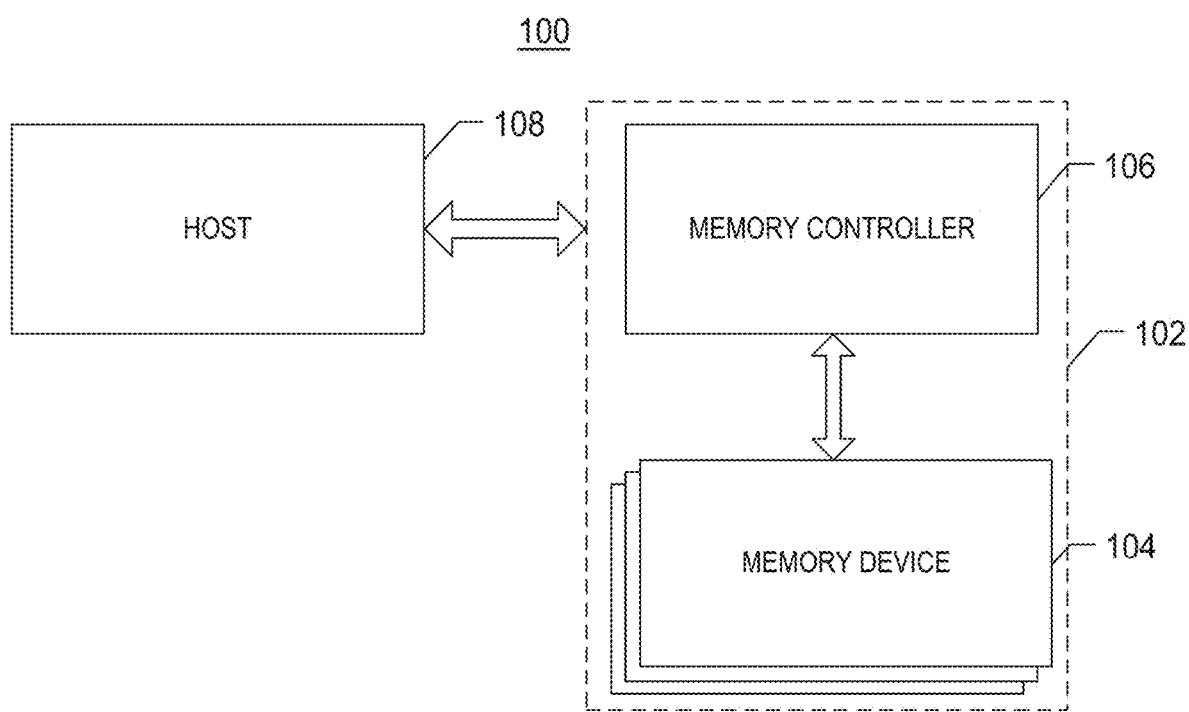
FIG. 1 is a schematic diagram of an example system with a memory system according to an example of the present disclosure.

In the above drawings (which are not drawn to scale), like reference numerals may describe like parts in the different views. Like reference numbers with different letter suffixes may indicate different examples of like parts. The drawings illustrate the various examples discussed herein, by way of example and not limitation.

DETAILED DESCRIPTION

Examples of the present disclosure will be described in more detail below with reference to the accompanying drawings. Although examples of the present disclosure are shown in the drawings, it should be understood that the present disclosure may be implemented in various ways and should not be limited to the DETAILED DESCRIPTION set forth herein. Rather, these examples are provided so that the present disclosure can be more thoroughly understood and the scope of the present disclosure can be fully conveyed to those skilled in the art.

In the following description, numerous specific details are given in order to provide a more thorough understanding of the present disclosure. It will be apparent, however, to one skilled in the art that the present disclosure may be practiced without one or more of these details. In other examples, some technical features well-known in the art are not described to avoid confusion with the present disclosure; that is, not all features of the actual example are described here, and well-known functions and structures are not described in detail.

In the drawings, the size of layers, regions, elements and their relative sizes may be exaggerated for clarity. Like reference numerals refer to like elements throughout.

It will be understood that when an element or layer is referred to as being "on," "adjacent to," "connected to" or "coupled to" other elements or layers, it can be directly on, adjacent to, connected to, or coupled to other elements or layers, or intervening elements or layers may be present. In contrast, when an element is referred to as being "directly on," "directly adjacent to," "directly connected to" or "directly coupled to" other elements or layers, there are no intervening elements or layers. It will be understood that, although the terms such as first, second, third etc. may be used to describe at least one of various elements, components, regions, layers or sections, at least one of these elements, components, regions, layers or sections should not be limited by these terms. These terms are only used to distinguish one element, component, region, layer or section from another element, component, region, layer or section.

Thus, a first element, component, region, layer or section discussed below could be represented as a second element, component, region, layer or section without departing from the teachings of the present disclosure. When a second element, component, region, layer or section is discussed, it does not indicate that a first element, component, region, layer or section exists in the present disclosure.

Spatial relationship terms such as "under", "below", "beneath", "underneath", "on", "above" and so on, can be used here for convenience to describe the relationship between one element or feature and other elements or features shown in the figures. It will be understood that the spatially relationship terms also comprise different orientations of the device in use and operation in addition to the orientation depicted in the figures. For example, if the device in the figures is turned over, elements or features described as "below" or "underneath" or "under" other elements or features would then be oriented as "above" the other elements or features. Thus, the example terms "below" and "under" can comprise both orientations of above and below. The device may be otherwise oriented (rotated 90 degrees or at other orientations) and the spatial descriptors used herein may be interpreted accordingly.

The terminology used herein is for the purpose of describing particular examples only and is not to be taken as a limitation of the present disclosure. As used herein, "a", "an" and "said/the" in singular forms are intended to include the plural forms as well, unless the context clearly dictates otherwise. It should also be understood that "comprising", when used in this specification, identifies the presence of at least one of stated features, integers, operations, elements or components, but does not exclude presence or addition of at least one of one or more other features, integers, operations, elements, components or groups. As used herein, the term "at least one of . . . " includes any and all combinations of the associated listed items.

For ease of understanding the characteristics and technical content of the examples of the present disclosure in more detail, the examples of the present disclosure will be described in detail below in conjunction with the accompanying drawings. The attached drawings are only for reference and description, and are not intended to limit the examples of the present disclosure.

The memory device in the examples of the present disclosure includes but is not limited to a three-dimensional NAND type memory, and for ease of understanding, a three-dimensional NAND type memory is used as an example for illustration.

FIG. 1 illustrates a block diagram of an example system 100 having a memory device, according to some aspects of the present disclosure. System 100 can be a mobile phone, a desktop computer, a laptop computer, a tablet, a vehicle computer, a gaming console, a printer, a positioning device, a wearable electronic device, a smart sensor, a virtual reality (VR) device, an argument reality (AR) device, or any other suitable electronic devices having storage therein. As shown in FIG. 1, system 100 can include a host 108 and a memory system 102 having one or more memory devices 104 and a memory controller 106. Host 108 can be a processor of an electronic device, such as a central processing unit (CPU), or a system-on-chip (SoC), such as an application processor (AP). Host 108 can be configured to send or receive data to or from the memory device 104.

Memory controller 106 is coupled to the memory device 104 and host 108 and is configured to control the memory device 104, according to some examples. Memory controller 106 can manage the data stored in memory device 104 and communicate with host 108. In some examples, memory controller 106 is designed for operating in a low duty-cycle environment like secure digital (SD) cards, compact Flash (CF) cards, universal serial bus (USB) Flash drives, or other media for use in electronic devices, such as personal computers, digital cameras, mobile phones, etc. In some examples, memory controller 106 is designed for operating in a high duty-cycle environment solid state disks (SSD) or embedded multi-media-cards (eMMCs) used as data storage for mobile devices, such as smartphones, tablets, laptop computers, etc., and enterprise storage arrays.

Memory controller 106 can be configured to control operations of the memory device 104, such as read, erase, and program operations. Memory controller 106 can also be configured to manage various functions with respect to the data stored or to be stored in the memory device 104 including, but not limited to bad-block management, garbage collection, logical-to-physical address conversion, wear leveling, etc. In some examples, memory controller 106 is further configured to process error correction codes (ECC) with respect to the data read from or written to the memory device 104. Any other suitable functions may be performed by memory controller 106 as well, for example, formatting the memory device 104. Memory controller 106 can communicate with an external device (e.g., host 108) according to a particular communication protocol. For example, memory controller 106 may communicate with the external device through at least one of various interface protocols, such as a USB protocol, an MMC protocol, a peripheral component interconnection (PCI) protocol, a PCI-express (PCI-E) protocol, an advanced technology attachment (ATA) protocol, a serial-ATA protocol, a parallel-ATA protocol, a small computer small interface (SCSI) protocol, an enhanced small disk interface (ESDI) protocol, an integrated drive electronics (IDE) protocol, a Firewire protocol, etc.

Figure 2B:
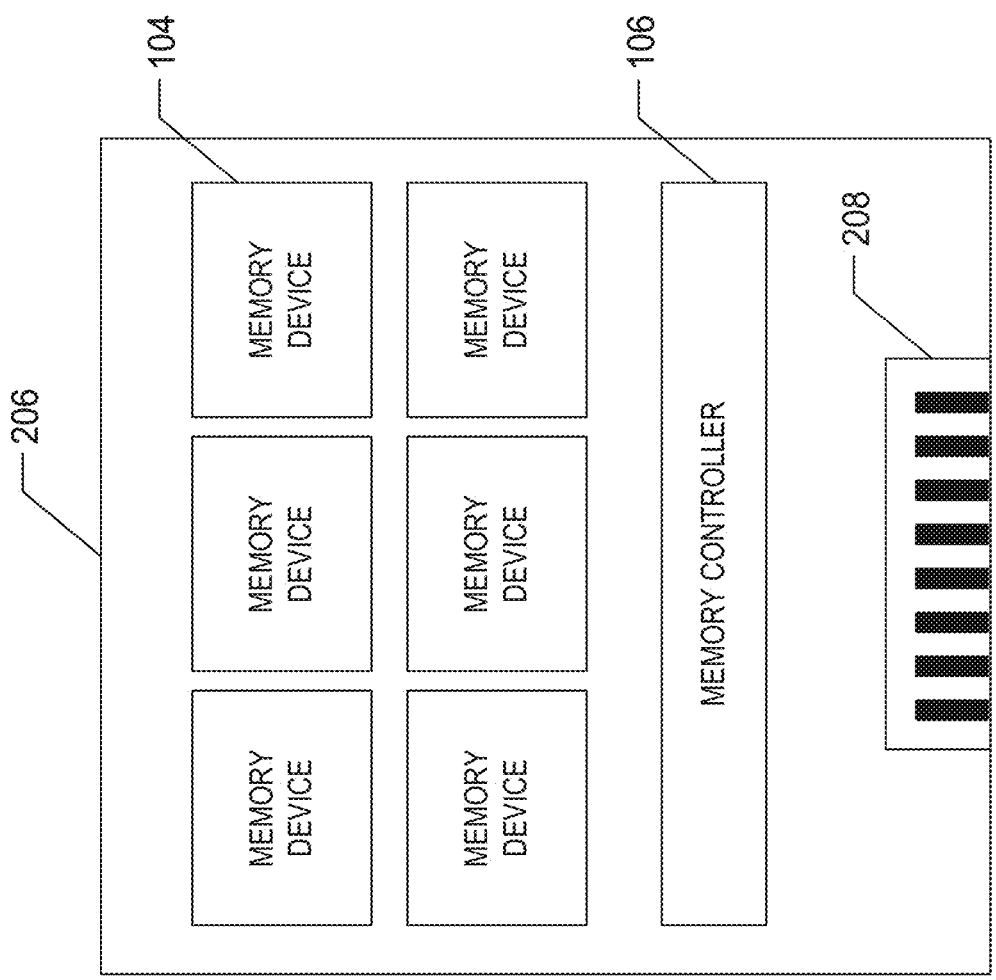
FIG. 2B is a schematic diagram of an example solid state drive with a memory system according to an example of the present disclosure.
Figure 2A:
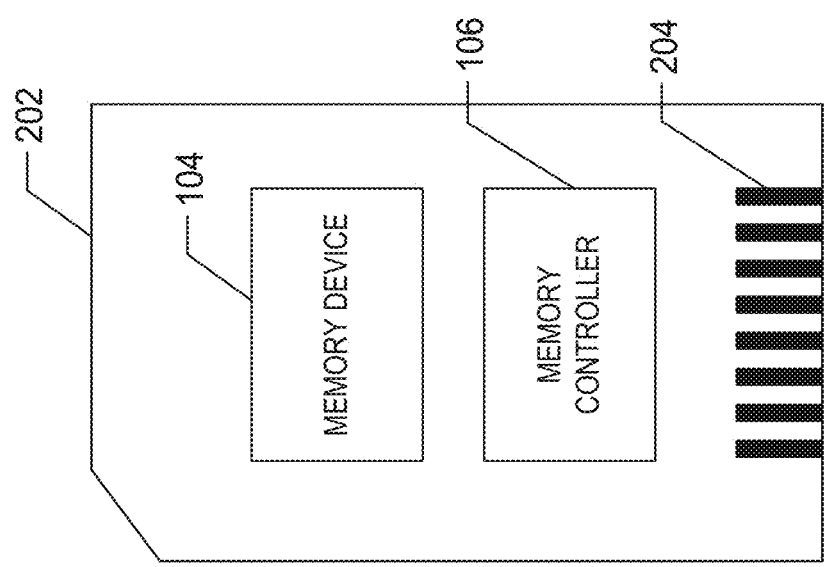
FIG. 2A is a schematic diagram of an example memory card with a memory system according to an example of the present disclosure.

Memory controller 106 and one or more memory devices 104 can be integrated into various types of storage devices, for example, be included in the same package, such as a universal Flash storage (UFS) package or an eMMC package. That is, memory system 102 can be implemented and packaged into different types of end electronic products. In one example as shown in FIG. 2A, memory controller 106 and a single memory device 104 may be integrated into a memory card 202. Memory card 202 can include a PC card (PCMCIA, personal computer memory card international association), a CF card, a smart media (SM) card, a memory stick, a multimedia card (MMC, RS-MMC, MMCmicro), an SD card (SD, miniSD, microSD, SDHC), a UFS, etc. Memory card 202 can further include a memory card connector 204 coupling the memory card 202 with a host (e.g., host 108 in FIG. 1). In another example as shown in FIG. 2B, the memory controller 106 and multiple memory devices 104 may be integrated into an SSD 206. SSD 206 can further include an SSD connector 208 coupling SSD 206 with a host (e.g., host 108 in FIG. 1). In some examples, at least one of the storage capacity or the operation speed of SSD 206 is greater than those of memory card 202.

Figure 3A:
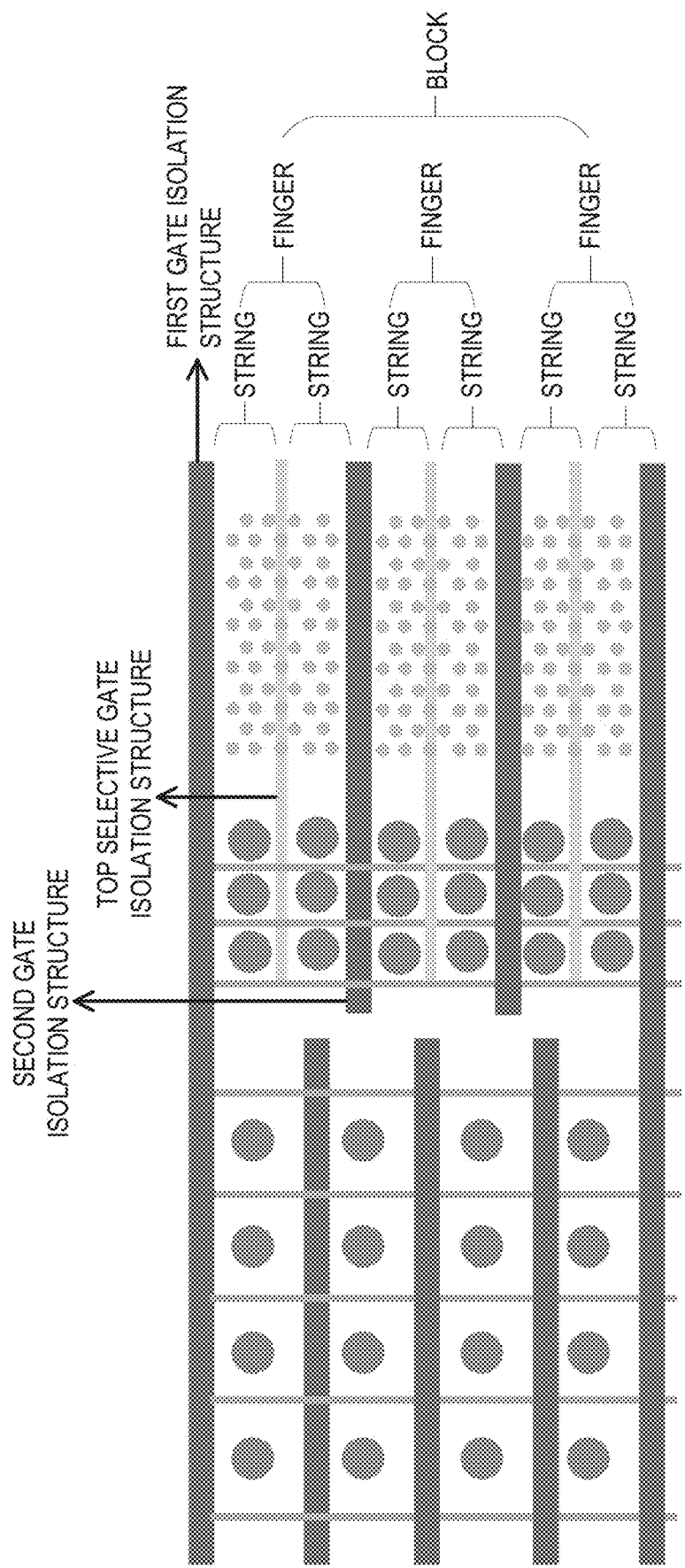
FIG. 3A is a schematic diagram of the distribution of memory cells of a three-dimensional NAND type memory according to an example of the present disclosure.

FIG. 3A provides a structural schematic diagram of a memory cell array of a three-dimensional NAND type memory. As shown in FIG. 3A, the memory cell array of a three-dimensional NAND type memory comprises several memory cell rows parallel to gate isolation structure and staggered in parallel. Every two rows of the memory cell rows are separated by a gate isolation structure and a top selective gate isolation structure, and each memory cell row includes a plurality of memory cells. The gate isolation structure may include a first gate isolation structure and a second gate isolation structure. The first gate isolation structure divides the memory cell array into a plurality of blocks, the plurality of second gate isolation structures can divide the blocks into multiple fingers, and the top selective gate isolation structure provided in the middle of each finger can divide the finger into two parts, so that the finger is divided into two strings. A block shown in FIG. 3A contains 6 strings, and in practical applications, the number of strings in a block is not limited to this. In some examples, each block can be coupled to multiple word lines (WL), and multiple memory cells coupled to each individually controlled word line form a page.

It should be noted that the number of memory cell rows between the gate isolation structure and the top selective gate isolation structure shown in FIG. 3A is merely an example, and is not used for limiting the number of memory cell rows contained in one finger of the three-dimensional NAND type memory in the present disclosure. In practical applications, the number of memory cell rows contained in one finger can be adjusted according to actual conditions, such as 2, 4, 8, 16, and so on.

Figure 3B:
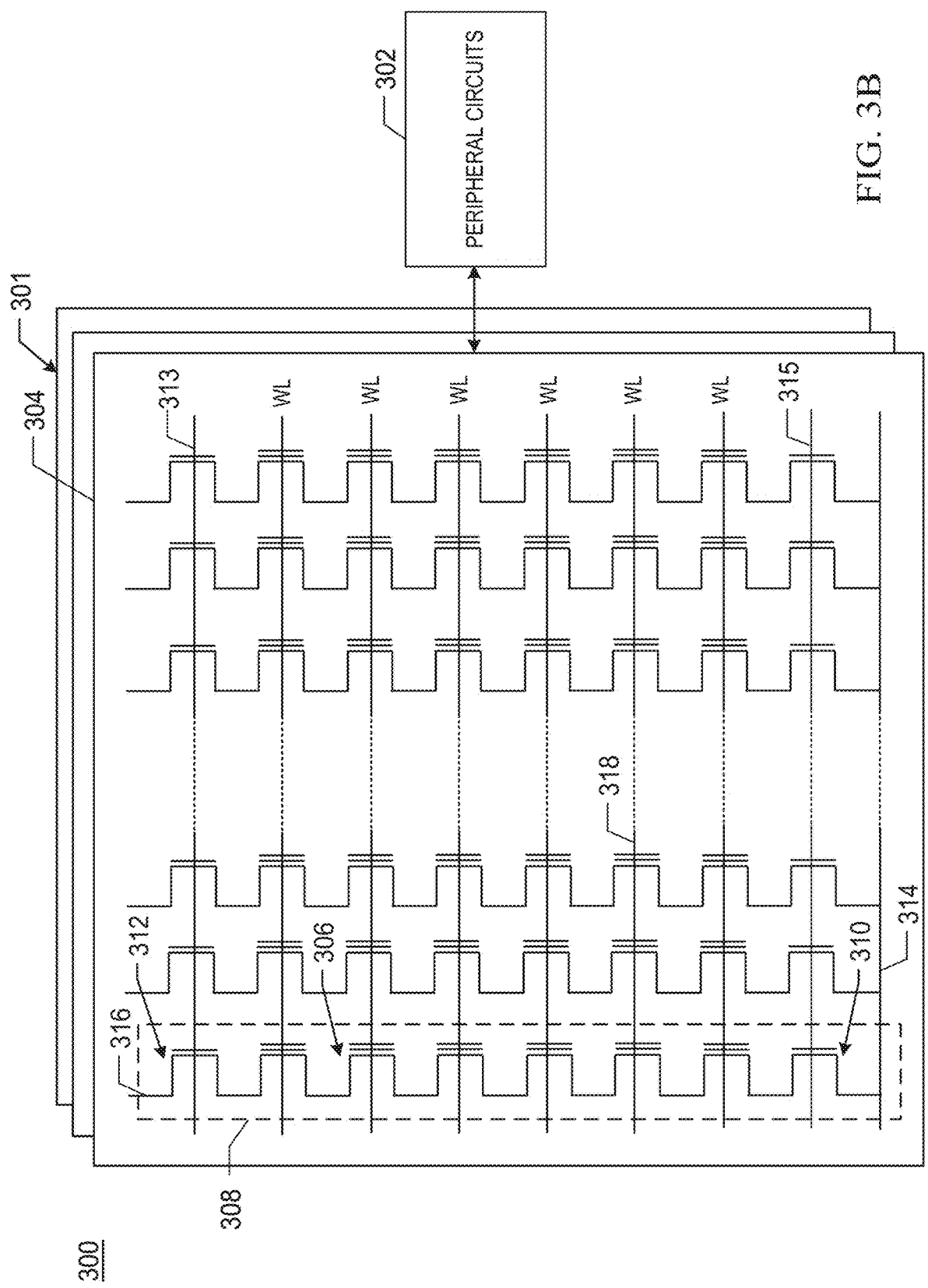
FIG. 3B is a schematic diagram of an example memory including peripheral circuits according to an example of the present disclosure.

FIG. 3B illustrates a schematic circuit diagram of an example memory device 300 including peripheral circuits, according to some aspects of the present disclosure. The memory device 300 can be an example of the memory device 104 in FIG. 1. The memory device 300 can include a memory cell array 301 and peripheral circuits 302 coupled to memory cell array 301. The memory cell array 301 is illustrated as an example of a three-dimensional NAND type memory cell array, in which memory cells 306 are NAND type memory cells and are provided in the form of an array of strings 308 each extending vertically above a substrate (not shown). As shown in FIG. 3B, each string 308 can include a bottom selective transistor 310 (also referred to as a source selective transistor BSG, which includes a source selective gate) at its source end and a top selective transistor 312 (also known as a drain selective transistor TSG, which includes a drain selective gate) at its drain end. Source selective transistor BSG 310 and drain selective transistor TSG 312 can be configured to activate selected strings 308 during read and program operations. In some examples, the sources of strings 308 in the same block 304 are coupled through the same source line (SL) 314, e.g., a common SL. In other words, all strings 308 in the same block 304 have an array common source (ACS), according to some examples. TSG 312 of each string 308 is coupled to a respective bit line (BL) 316 from which user data can be read or written via an output bus (not shown), according to some examples. In some examples, each string 308 is configured to be selected or deselected by at least one of: applying a select voltage (e.g., above the threshold voltage of the transistor having TSG 312) or a deselect voltage (e.g., 0 V) to respective TSG 312 through one or more TSG lines 313 or applying a select voltage (e.g., above the threshold voltage of the transistor having BSG 310) or a deselect voltage (e.g., 0 V) to respective BSG 310 through one or more BSG lines 315.

As shown in FIG. 3B, the strings 308 can be organized into multiple blocks 304, each of which can have a common source line 314, e.g., coupled to the ground. In some examples, each block 304 is the basic data unit for erase operations, i.e., all memory cells 306 on the same block 304 are erased at the same time. To erase memory cells 306 in a selected block 304, source lines 314 coupled to selected block 304 as well as unselected blocks 304 in the same plane as selected block 304 can be biased with an erase voltage (Vers), such as a high positive voltage (e.g., 20 V or more). It is understood that in some examples, erase operation may be performed at a half-block level, a quarter-block level, or a level having any suitable number of blocks or any suitable fractions of a block. Memory cells 306 of adjacent strings 308 can be coupled through word lines 318 that select which row of memory cells 306 is affected by read and program operations. In some examples, with reference to FIG. 3A above, the plurality of memory cells are isolated by the top selective gate isolation structure and the gate isolation structure. The multiple memory cells between the top selective gate isolation structure and the gate isolation structure are arranged into multiple memory cell rows, and each memory cell row is parallel to the gate isolation structure and the top selective gate isolation structure.

Referring to FIG. 3A and FIG. 3B, each memory cell 306 of the plurality of memory cells is coupled to respective word lines 318, and each string 308 is coupled to respective bit lines 316 via a respective selective transistor (such as top selective transistor (TSG) 312).

Figure 4:
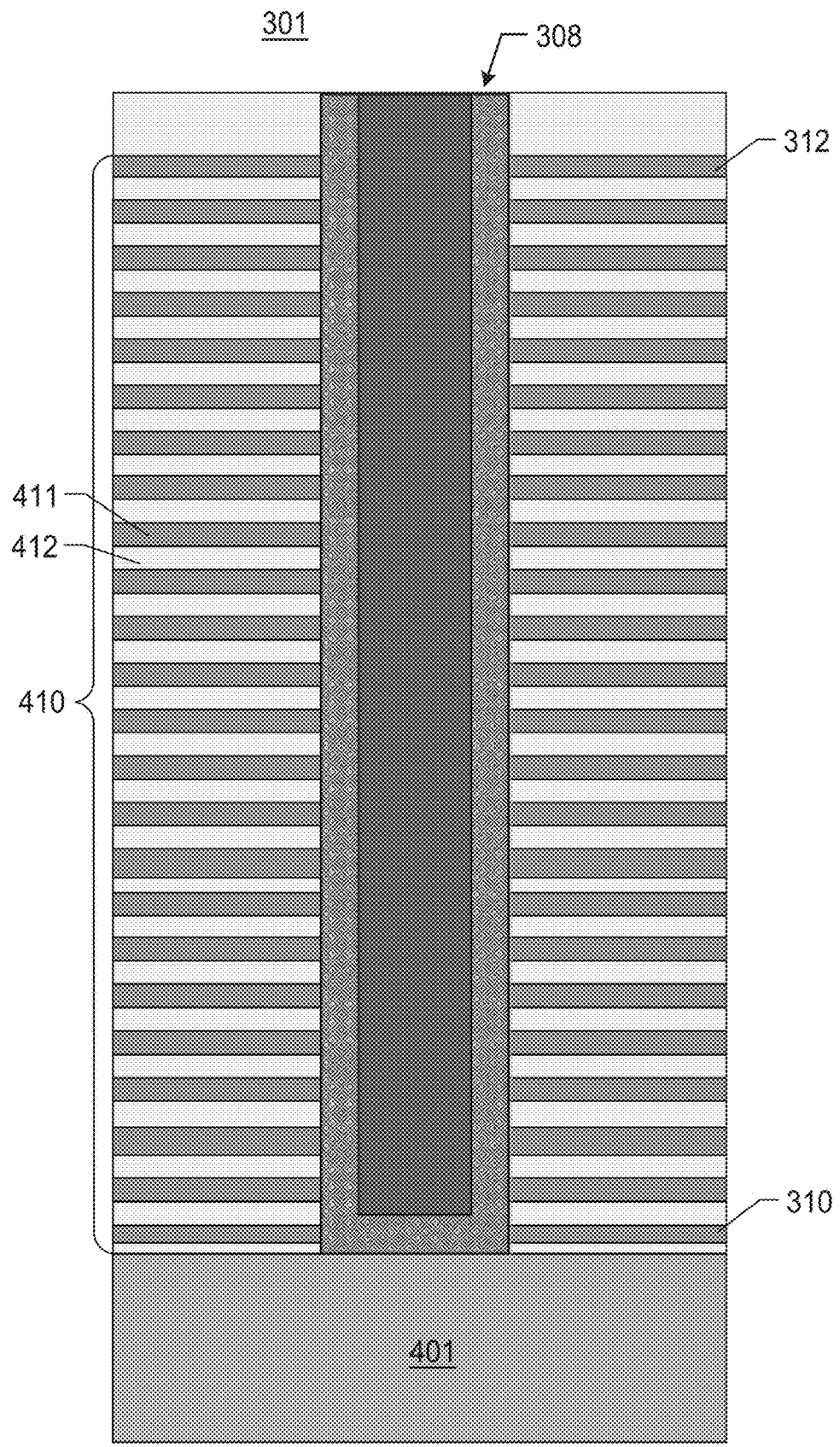
FIG. 4 is a schematic cross-sectional view of a memory cell array including NAND type strings according to an example of the present disclosure.

FIG. 4 shows a schematic cross-sectional view of an example memory cell array 301 including strings 308, exemplified by NAND, in accordance with aspects of the present disclosure. As shown in FIG. 4, the NAND memory cell array 301 may include a stacked structure 410, which includes a plurality of gate layers 411 and a plurality of insulating layers 412 alternately stacked in sequence, and a channel structure penetrating vertically through the gate layers 411 and the insulating layers 412. The channel structure is coupled with each gate layer to form a memory cell, and the channel structure is coupled with multiple gate layers in the stacked structure 410 to form a string 308. The gate layer 411 and the insulating layer 412 can be stacked alternately, and two adjacent gate layers 411 are separated by an insulating layer 412.

The constituent material of the gate layer 411 may include a conductive material. The conductive material may include but is not limited to tungsten (W), cobalt (Co), Copper (Cu), aluminum (Al), polysilicon, doped silicon, silicide, or any combination thereof. In some examples, each gate layer 411 may include a metal layer, e.g., a tungsten layer. In some examples, each gate layer 411 includes a doped polysilicon layer. Each gate layer 411 may include a control gate surrounding the memory cell. The gate layer 411 at the top of the stacked structure 410 may extend laterally as a top selective gate line, the gate layer 411 at the bottom of the stacked structure 410 may extend laterally as a bottom selective gate line, and the gate layer 411 extending laterally between the top selective gate line and the bottom selective gate line may be used as a word line layer.

In some examples, the stacked structure 410 may be disposed on a substrate 401. The substrate 401 may include silicon (e.g., monocrystalline silicon), silicon germanium (SiGe), gallium arsenide (GaAs), germanium (Ge), silicon-on-insulator (SOI), germanium-on-insulator (GOI), or any other suitable material.

In some examples, the string 308 includes a channel structure extending vertically through the stacked structure 410. In some examples, the channel structure includes a channel hole filled with semiconductor material(s) (e.g., as a semiconductor channel) and dielectric material(s) (e.g., as a memory film). In some examples, the semiconductor channel includes silicon, e.g., polysilicon. In some examples, the memory film is a composite dielectric layer including a tunneling layer, a storage layer (also referred to as a "charge trap/storage layer"), and a blocking layer. The channel structure may have a cylindrical shape (e.g., a pillar shape). According to some examples, the semiconductor channel, the tunneling layer, the storage layer and the blocking layer are radially arranged in this order from the center of the pillar toward the outer surface of the pillar. The tunneling layer may include silicon oxide, silicon oxynitride, or any combination thereof. The storage layer may include silicon nitride, silicon oxynitride, or any combination thereof. The blocking layer may include silicon oxide, silicon oxynitride, a high dielectric constant (high-k) dielectric, or any combination thereof. In one example, the memory film may include a composite layer of silicon oxide/silicon oxynitride/silicon oxide (ONO).

Figure 5:
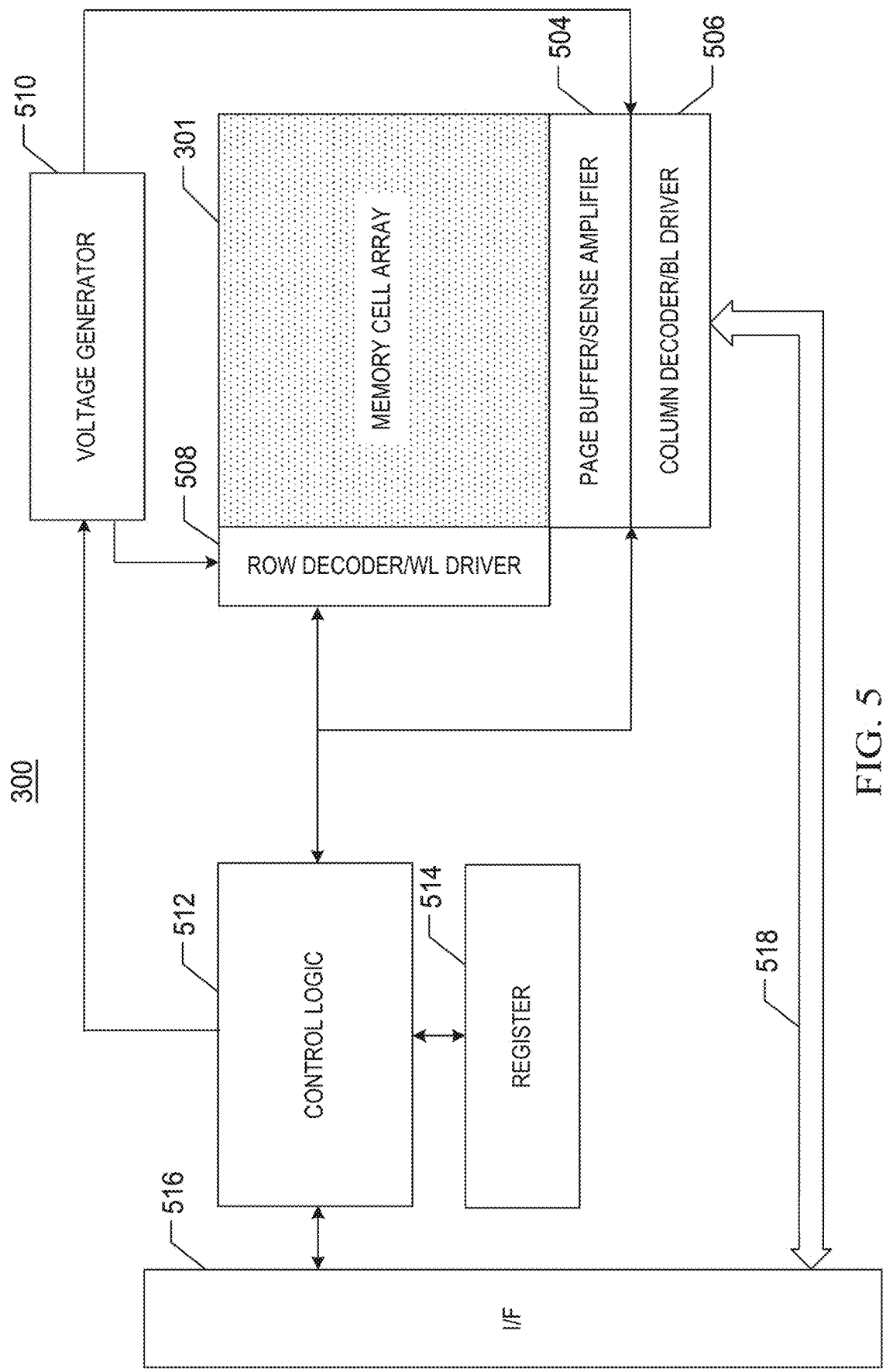
FIG. 5 is a schematic diagram of an example memory device including a memory cell array and peripheral circuits according to an example of the present disclosure.

Referring back to FIG. 3B, peripheral circuits 302 can be coupled to memory cell array 301 through bit lines 316, word lines 318, source lines 314, BSG lines 315, and TSG lines 313. Peripheral circuits 302 can include any suitable analog, digital, and mixed-signal circuits for facilitating the operations of memory cell array 301 by applying and sensing at least one of voltage signals or current signals to and from each target memory cell 306 through bit lines 316, word lines 318, source lines 314, BSG lines 315, and TSG lines 313. Peripheral circuits 302 can include various types of peripheral circuits formed using metal-oxide-semiconductor (MOS) technologies. For example, FIG. 5 illustrates some example peripheral circuits, the peripheral circuits 302 including a page buffer/sense amplifier 504, a column decoder/bit line driver 506, a row decoder/word line driver 508, a voltage generator 510, control logic 512, registers 514, an interface 516, and a data bus 518. It is understood that in some examples, additional peripheral circuits not shown in FIG. 5 may be included as well.

Page buffer/sense amplifier 504 can be configured to read and program (write) data from and to memory cell array 301 according to the control signals from control logic 512. In one example, page buffer/sense amplifier 504 may store program data (write user data) to be programmed into memory cell array 301. In another example, page buffer/sense amplifier 504 may perform program verify operations to ensure that the data has been properly programmed into memory cells 306 coupled to selected word lines 318. In still another example, page buffer/sense amplifier 504 may also sense the low power signals from bit line 316 that represents a data bit stored in memory cell 306 and amplify the small voltage swing to recognizable logic levels in a read operation. Column decoder/bit line driver 506 can be configured to be controlled by control logic 512 and select one or more strings 308 by applying bit line voltages generated from voltage generator 510.

Row decoder/word line driver 508 can be configured to be controlled by control logic 512 and select/deselect blocks 304 of memory cell array 301 and select/deselect word lines 318 of block 304. Row decoder/word line driver 508 can be further configured to drive word lines 318 using word line voltages generated from voltage generator 510. In some examples, row decoder/word line driver 508 can also select/deselect and drive BSG lines 315 and TSG lines 313 as well. As described below in detail, row decoder/word line driver 508 is configured to perform program operations on the memory cells 306 coupled to the selected word line(s) 318. Voltage generator 510 can be configured to be controlled by control logic 512 and generate the word line voltages (e.g., read voltage, program voltage, pass voltage, channel boost voltage, verification voltage, etc.), bit line voltages, and source line voltages to be supplied to memory cell array 301.

Control logic 512 may be coupled to each other part of the peripheral circuits described above and configured to control the operation of each other part of the peripheral circuits. Registers 514 can be coupled to control logic 512 and include status registers, command registers, and address registers for storing status information, command operation codes (OP codes), and command addresses for controlling the operations of each peripheral circuit. Interface 516 may be coupled to control logic 512 and act as a control buffer to buffer and relay control commands received from a host (not shown) to control logic 512, and to buffer and relay status information received from control logic 512 to the host. Interface 516 may further be coupled to column decoder/bit line driver 506 via data bus 518 and act as a data I/O interface and data buffer to buffer and relay data to or from memory cell array 301.

In related technologies, with the rapid development of computer application technologies, electronic devices generally have a log function. A large amount of serial port information is stored in the log file of the electronic device for recording the operation condition of the device. During the development and debugging, a large amount of serial port information will be added into the firmware located in the memory controller to record the operation status, bugs, etc. Developers or maintenance personnel use the log function to search for the serial port information in the log file to locate and address the bugs of the device.

Figure 6:
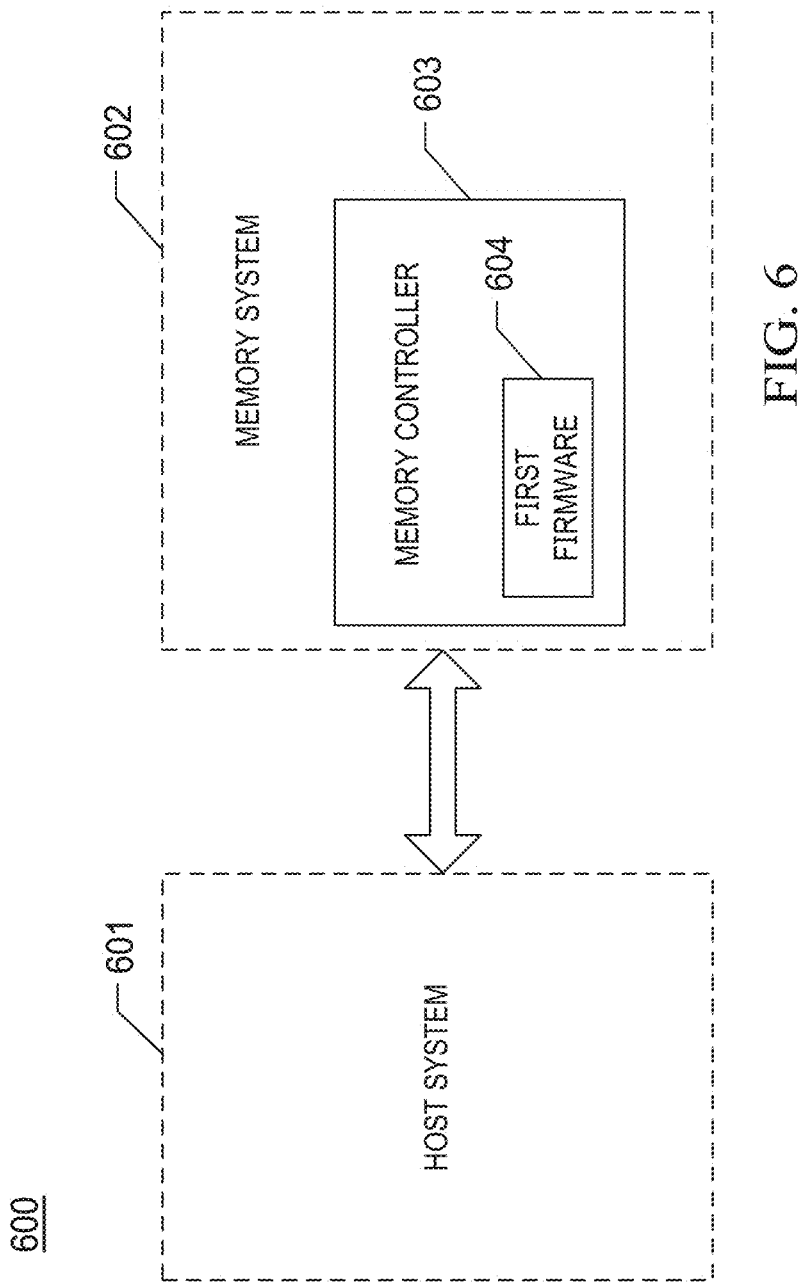
FIG. 6 is a schematic structural diagram of an electronic device according to an example of the present disclosure.
Figure 7:
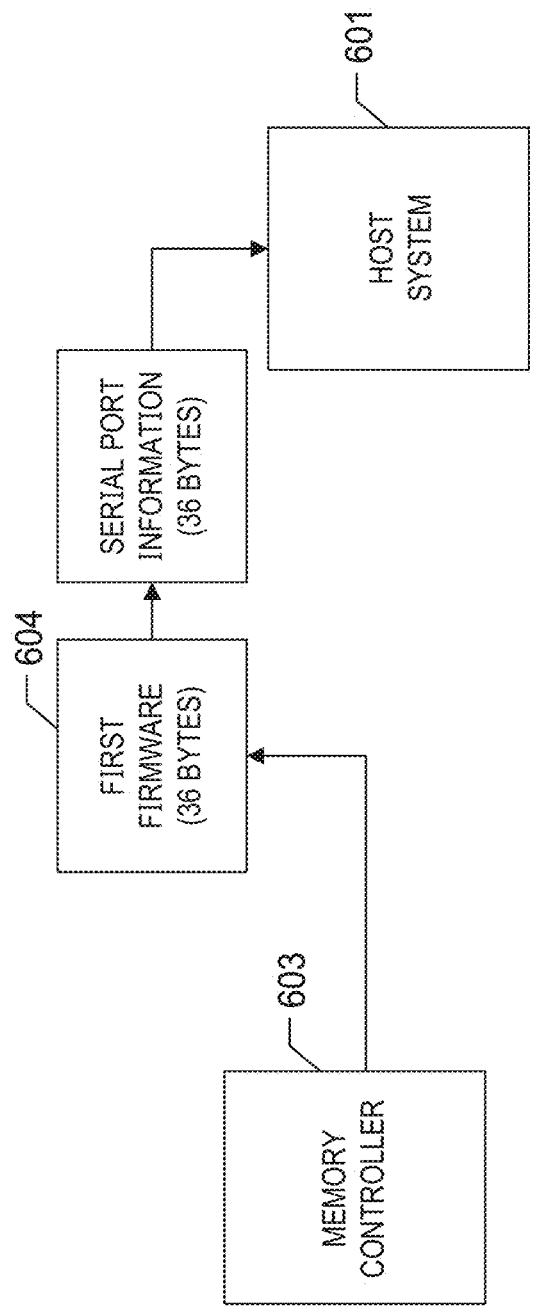
FIG. 7 is a schematic diagram of information interaction between a memory controller and a host system according to an example of the present disclosure.

As an example, referring to FIGS. 6 and 7, FIG. 6 is a schematic structure diagram of an electronic device according to an example of the present disclosure, and FIG. 7 is a schematic diagram of information interaction between a memory controller and a host system according to an example of the present disclosure. With reference to FIG. 6, the electronic device 600 includes a host system 601 and a memory system 602 coupled to the host system 601. The memory system 602 includes a memory controller 603, and the memory controller includes a first firmware 604. During the development and debugging, developers or maintenance personnel utilizes the host system 601 to save development or debugging information (i.e., serial port information) in the form of files in the first firmware 604 of the memory controller 603. Here, the storage capacity of the first firmware can be configured selectively according to the storage capacity for the serial port information. In other words, when the storage capacity for the serial port information is larger, the storage capacity of the first firmware used to store the serial port information is larger. When the serial port information needs to be called, the host system 601 sends an instruction to the memory controller 603, instructing to obtain the corresponding serial port information. Referring to FIG. 7, after receiving the instruction, the memory controller 603 loads the serial port information stored in the first firmware 604 and sends the serial port information corresponding to the instruction to the host system 601.

However, as electronic devices continue to be updated, the amount of serial port information that needs to be called gradually increases, and the memory space used to store serial port information in the memory controller (the storage capacity of the first firmware) also increases. At the same time, it takes more time for the memory controller to output serial port information. Moreover, the serial port information stored in the first firmware is difficult to remove, which brings additional burden to the use of electronic device. For example, when the storage capacity for the serial port information that the host system needs to call is 36 bytes, the memory controller loads the serial port information of 36 bytes corresponding to the instruction in the first firmware, and then sends the serial port information of 36 bytes to host system. Based on this, as the amount of serial port information to be called gradually increases, the amount of serial port information sent by the memory controller to the host system also gradually increases. In addition, it should be noted that when the memory system (memory controller here) sends serial port information to the host system, it needs to first format the serial port information into a string, and then send the string to the host system. In this way, as the amount of called serial port information gradually increases, the complexity of transmitting serial port information from the memory system to the host system increases.

Figure 8:
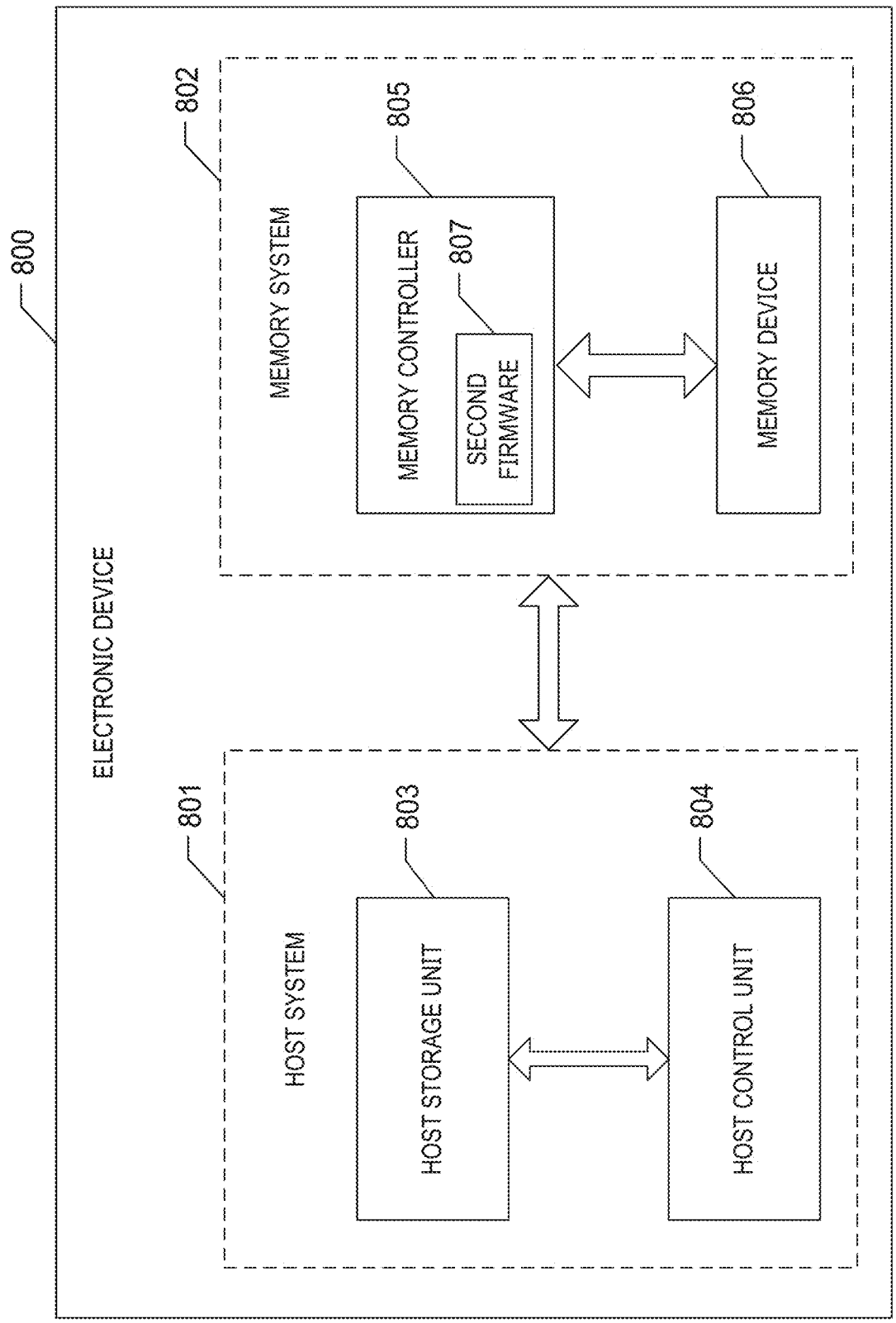
FIG. 8 is a schematic structural diagram of another electronic device according to an example of the present disclosure.

To address one or more of the above problems, examples of the present disclosure provide an electronic device and an operation method thereof, a memory system, and a storage medium. With reference to FIG. 8, which is a schematic structural diagram of another electronic device according to an example of the present disclosure, the electronic device 800 includes a host system 801 and a memory system 802 coupled to the host system 801. The host system 801 includes a host storage unit 803 and a host control unit 804. The host control unit 804 is configured to send instructions, and the host storage unit 803 is configured to store instruction information and the like. The host control unit 804 may be coupled to the host storage unit 803 in any suitable manner. The memory system 802 includes a memory controller 805 and a memory device 806. The memory controller 805 is configured to control the memory device 806 to perform operations such as read, write, and erase. The memory controller 805 and the memory device 806 can be coupled in any suitable manner. The memory controller 805 includes a second firmware 807, which can be used to load/store information corresponding to different application programs, such as storing index values described below. It should be noted that both the first firmware 604 mentioned in the previous example and the second firmware 807 mentioned in the example of the present disclosure are located in the corresponding memory controller. In some examples, the first firmware 604 and the second firmware 807 may be the same or different. It should be understood that the storage capacity of the second firmware can be configured selectively according to actual needs, such as the storage capacity occupied by the index value. For example, when the storage capacity for the index value is smaller, the storage capacity of the second firmware used to store the index value is configured to be smaller, so that the storage capacity of the memory controller can be saved.

Figure 9:
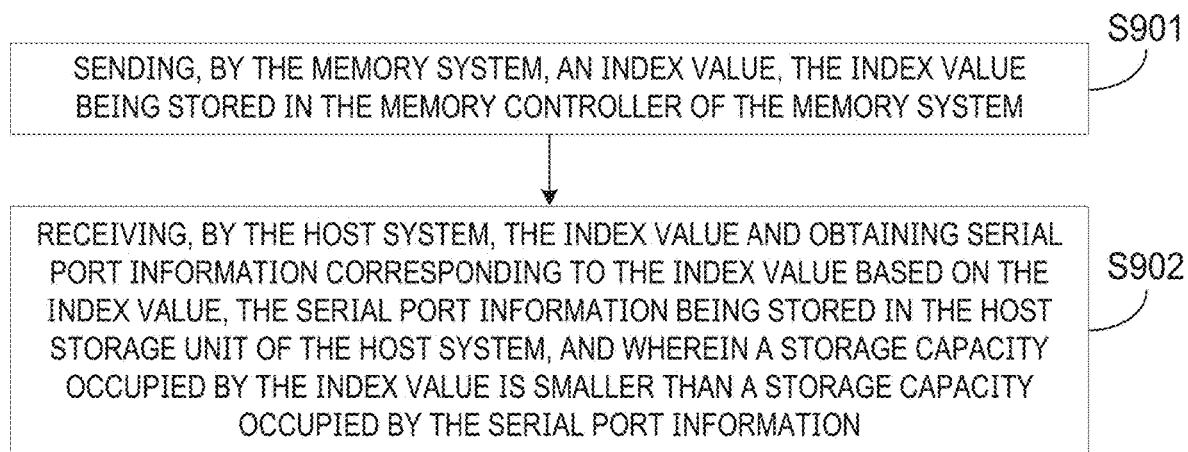
FIG. 9 is a schematic flowchart illustrating an operation method of an electronic device according to an example of the present disclosure.

Referring to FIG. 9, which is a schematic flowchart of an operation method of an electronic device according to an example of the present disclosure, the operation method of the electronic device includes the following operations:

Operation S901: sending, by the memory system, an index value, the index value being stored in the memory controller of the memory system; and Operation S902: receiving, by the host system, the index value and obtaining serial port information corresponding to the index value based on the index value, the serial port information being stored in the host storage unit, and wherein a storage capacity occupied by the index value is smaller than a storage capacity occupied by the serial port information.

It should be noted that before executing the above operation S901, the operation method further includes: obtaining, by the host system, all the serial port information in the memory device and setting the index values corresponding to all the serial port information; and establishing the mapping table based on all the serial port information and the index values corresponding to all the serial port information.

Figure 10:
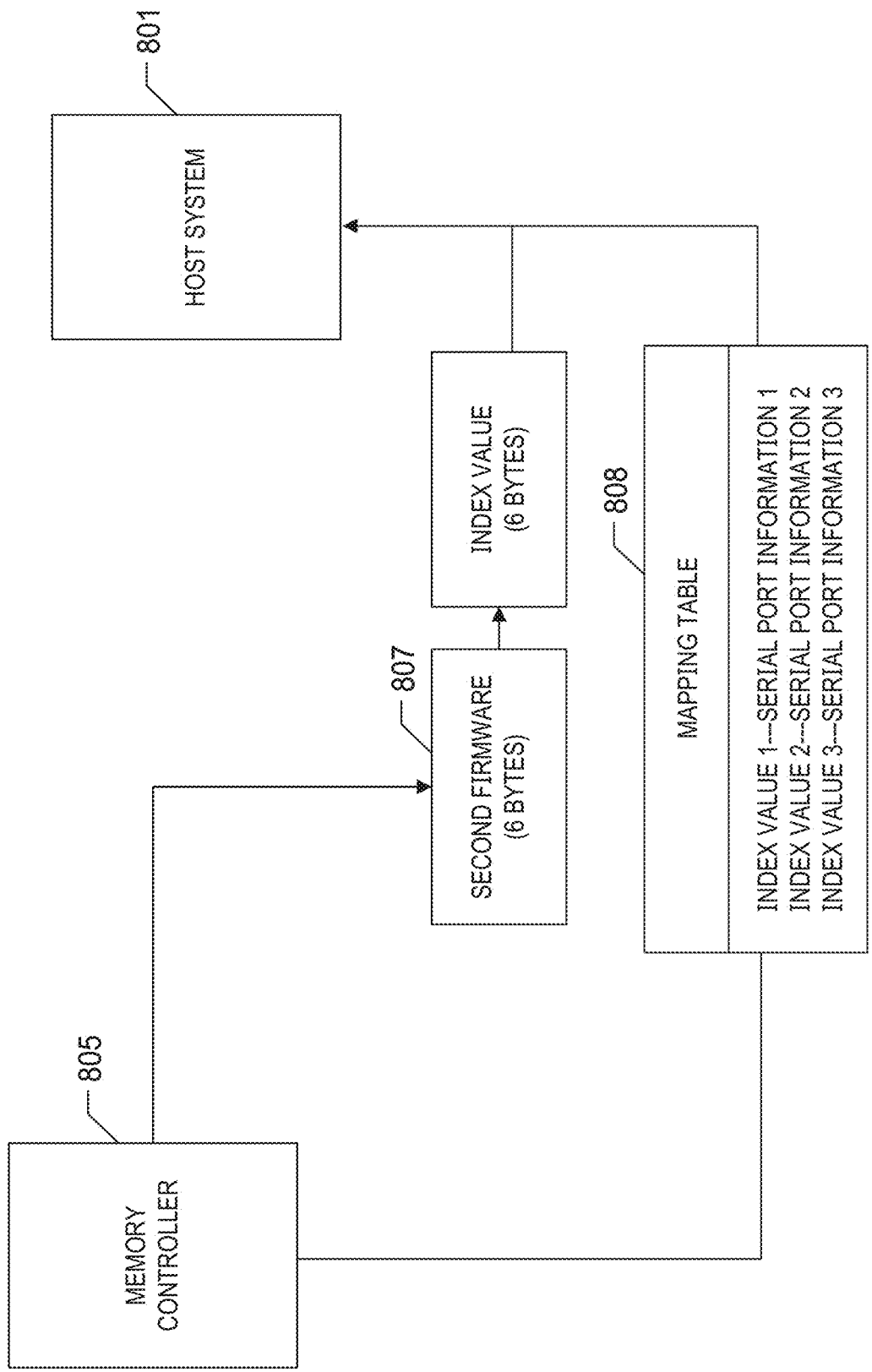
FIG. 10 is a schematic diagram of another information interaction between a memory controller and a host system according to an example of the present disclosure.

For example, referring to FIG. 8, FIG. 9, and FIG. 10, FIG. 10 is a schematic diagram of another information interaction between the memory controller and the host system according to an example of the present disclosure. After completing the program/write operation of data, the memory device 806 scans the memory device 806 for the log files corresponding to all applications to obtain the serial port information stored in all log files, sets corresponding index values for each serial port information among all the serial port information, and stores all index values in the memory controller 805 of the memory system. In some examples, all index values are stored in the second firmware 807 of the memory controller 805. Here, the index value can correspond to the serial port information may one-by-one or one-to-many. In the example of the present disclosure, the index value corresponds to the serial port information one-by-one in order to facilitate accurate search of the serial port information. In some examples, the index value is determined by the file where the serial port information is located and its position in the file jointly. In this way, it can be ensured that the index values correspond to the serial port information one-by-one. In some examples, referring to FIG. 10, the index values may include multiple index values, such as index value 1, index value 2, index value 3 . . . , and the corresponding serial port information may also include multiple serial port information, such as serial port information 1, serial port information 2, serial port information 3 Here, index value 1 corresponds to serial port information 1, index value 2 corresponds to serial port information 2, index value 3 corresponds to serial port information 3, and so on.

It should be noted that the storage capacity occupied by the index value is less than the storage capacity occupied by the serial port information corresponding to the index value. In some examples, the storage capacity occupied by the index value is ⅙ of the storage capacity occupied by the corresponding serial port information. That is, the storage capacity occupied by the serial port information is 6 times the storage capacity occupied by the index value corresponding to the serial port information. For example, the storage capacity occupied by the serial port information is 36 bytes, and the storage capacity occupied by the index value corresponding to the serial port information is 6 bytes. Based on this, since the storage capacity occupied by the index value is smaller than the storage capacity occupied by the serial port information, storing the index value in the memory controller saves large amount of storage space of the memory controller compared to storing the serial port information corresponding to the index value in the memory controller.

Next, a mapping table is established based on all serial port information and all index values to realize the mapping between serial port information and index values. In other words, the mapping table includes all serial port information and index values corresponding to all serial port information. Next, the mapping table and all corresponding serial port information are stored in the host storage unit 803.

It should be noted that all serial port information may be removed to reduce the extra storage space occupied by the serial port information after completing the establishment of the mapping table for all serial port information and all index values, in the example of the present disclosure.

Next, operation S901 is executed, and sending the index value to the host system 801 when an abnormality occurs in the memory system 802.

It should be noted that abnormality can include the situation where bugs occur in the memory system and maintenance personnel call serial port information, and the situation where developers or maintenance personnel subjectively want to obtain or view serial port information when the memory system is running normally. In the above situations, developers or maintenance personnel may use the host system (such as the host control unit) to send instructions to the memory system, instructing to obtain the corresponding serial port information.

In operation S901, after receiving the instruction, the memory system sends the index value corresponding to the serial port information to the host control unit of the host system according to the instruction. It should be understood that the storage capacity for the index value is smaller than the storage capacity for the serial port information corresponding to the index value. The memory controller sends the index value to the host system, which reduces the amount of data sent by the memory controller compared to the memory controller sending the corresponding serial port information to the host system. Meanwhile, the time spent by the memory controller is reduced, and the data transmission efficiency or transmission performance is improved.

Next, operation S902 is executed. The host system is configured to receive the index value, and after receiving the corresponding index value, obtain the serial port information corresponding to the index value based on the index value.

In some examples, the host control unit 804 of the host system is configured to: receive the index value, search the mapping table stored in the host storage unit 803 based on the index value, and obtain the serial port information corresponding to the index value in combination with the mapping table. For example, referring to FIG. 10, the memory controller 805 loads the corresponding index value in the second firmware 807 and sends the index value to the host system 801, wherein the storage capacity for the index value is, for example, 6 bytes. After receiving the index value, the host system 801 traverses all the serial port information in combination with the mapping table 808, parses the corresponding index value, and determines the serial port information corresponding to the corresponding index value.

In the example of the present disclosure, when the host system obtains the serial port information, the memory system only needs to send the index value to the host system, and there is no need to convert the serial port information into a formatted string for transmission. In this way, on the one hand, the amount of transmitted data is reduced, and the data transmission efficiency is improved. On the other hand, the complexity of data transmission is reduced, and the data transmission performance is improved.

For this end, in the example of the present disclosure, the storage capacity occupied by the index value is smaller than the storage capacity occupied by the serial port information corresponding to the index value. Therefore, the serial port information is stored in the host storage unit and the index value corresponding to the serial port information is stored in the memory controller, and when the memory controller needs to feed back serial port information to the host system, the memory controller only needs to send the index value corresponding to the serial port information to the host system, and the host system obtains the corresponding serial port information from the host storage unit based on the index value. In this way, since the storage capacity occupied by the index value sent to the host system by the memory controller is less, the amount of data sent to the host system by the memory controller is reduced, which saves the data transmission time and is conducive to improving the data transmission efficiency and transmission performance. On the other hand, storing the index value in the memory controller saves the storage space of the memory controller and improves the memory resource utilization of the memory controller compared to storing the serial port information in the memory controller.

Based on the above operation method of an electronic device, an example of the present disclosure provides an electronic device. The electronic device comprises: a host system and a memory system coupled to the host system, the memory system comprising a memory controller, and the host system comprising a host storage unit, wherein the memory system is configured to send an index value, the index value being stored in the memory controller; and the host system is configured to receive the index value and obtain corresponding serial port information based on the index value, the serial port information being stored in the host storage unit, and wherein a storage capacity occupied by the index value is smaller than a storage capacity occupied by the serial port information.

In some examples, the host system is configured to: obtain the serial port information corresponding to the index value based on the index value in combination with a mapping table, and wherein the mapping table comprises all serial port information and index values corresponding to all the serial port information, and the mapping table is stored in the host storage unit.

In some examples, the memory system further comprises a memory device coupled to the memory controller, and the host system is further configured to: before sending the index value by the memory system, obtain all the serial port information in the memory device and set the index values corresponding to all the serial port information; and establish the mapping table based on all the serial port information and the index values corresponding to all the serial port information.

In some examples, the index values correspond to the serial port information one-by-one.

In some examples, the memory system is further configured to: send the index value when an abnormality occurs in the memory system.

Based on the above electronic device and operation method thereof, examples of the present disclosure provide a memory system coupled to a host system and comprising a memory controller configured to: send an index value, the index value being stored in the memory controller and corresponding to serial port information stored in the host system, and wherein a storage capacity occupied by the index value is smaller than a storage capacity occupied by the serial port information.

Based on the above electronic device and operation method thereof, another memory system is provided in an example of the present disclosure, wherein the memory system is coupled to the host system and comprises: a memory controller and a memory device coupled to the memory controller, wherein the memory controller is configured to send an index value, the index value being stored in the memory controller; the memory device is configured to: receive the index value and determine serial port information corresponding to the index value based on the index value; and send the serial port information to the memory controller, the serial port information being stored in the memory device, and wherein the memory controller is further configured to: receive the serial port information; and send the serial port information to the host system.

Figure 11:
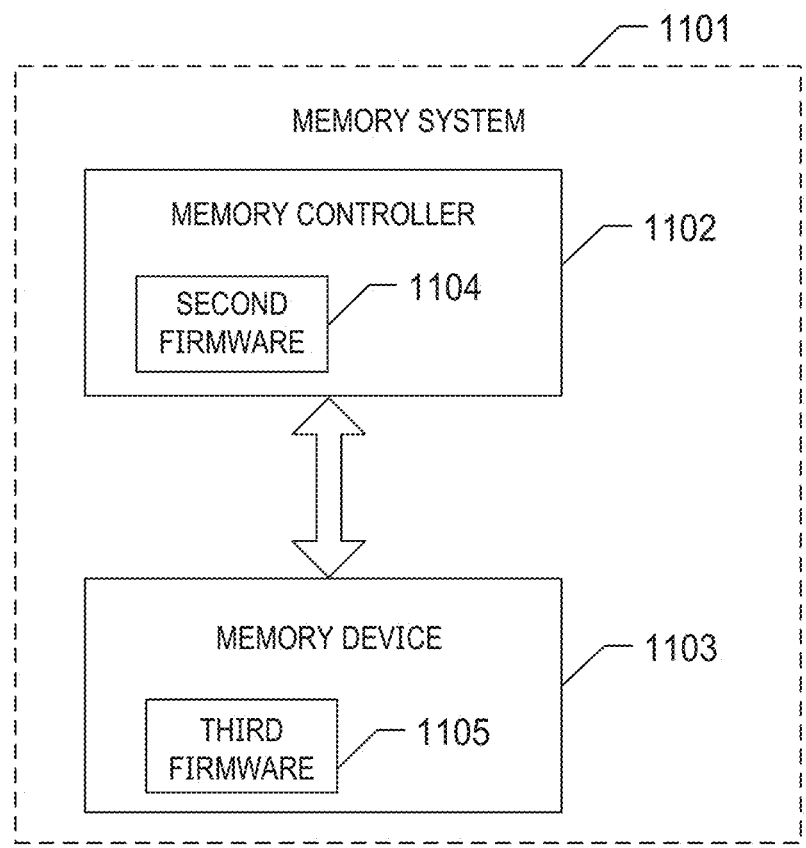
FIG. 11 is a schematic structural diagram of a memory system according to an example of the present disclosure.

Referring to FIG. 11, which shows a schematic structural diagram of a memory system according to an example of the present disclosure, the memory system 1101 includes a memory controller 1102 and a memory device 1103. The memory controller 1102 is configured to control the memory device 1103 to perform operations such as read, write and erase. The memory controller 1102 may be coupled to the memory device 1103 in any suitable manner. The memory controller 1102 includes a second firmware 1104, which can be used to load information corresponding to different applications, such as the index values described below. It should be noted that the second firmware 1104 mentioned in the example of this disclosure is the same as the second firmware 807 mentioned in the previous examples. Like the previous example, serial port information corresponds to index values one-by-one, and a mapping table is established based on all serial port information and the index values corresponding to all serial port information. The memory device 1103 includes a third firmware 1105, which can be used to store all serial port information and the mapping table. In other words, in the example of the present disclosure, all serial port information and its mapping table are stored in the memory device 1103, such as in the third firmware 1105 of the memory device 1103. The index value corresponding to the serial port information is stored in the memory controller 1102, such as in the second firmware 1104 of the memory controller 1102.

After the memory system 1101 receives an instruction to obtain serial port information sent by the host system (not shown in FIG. 11), the index value is sent to the memory device 1103 by the memory controller 1102. In some examples, the memory device 1103 traverses all the serial port information based on the received index value in combination with the mapping table to determine the serial port information corresponding to the index value, and then sends the serial port information to the memory controller. After obtaining the corresponding serial port information, the memory controller formats the serial port information into a string and sends it to the host system.

In the example of the present disclosure, since the storage capacity occupied by the index value is less than the storage capacity occupied by the serial port information corresponding to the index value, compared to storing the serial port information corresponding to the index value in the memory controller, storing the index value in the memory controller can save the storage space of the memory controller and improve the storage space utilization of the memory controller.

An example of the present disclosure also provides a storage medium storing therein executable instructions that, when executed by an electronic device, can implement the operations of the operation method of the electronic device as described in the above examples of the present disclosure.

In some examples, the storage medium may be memories such as Ferromagnetic Random Access Memory (FRAM), Read Only Memory (ROM), or Programmable Read-Only Memory (PROM), Erasable Programmable Read-Only Memory (EPROM), Electrically Erasable Programmable Read-Only Memory (EEPROM), Flash Memory, magnetic surface memory, optical disc, or Compact Disc Read-Only Memory (CD-ROM); alternatively, it may be various devices including one of the above memory devices or any combination thereof.

In some examples, executable instructions may in the form of a program, software, software module, script, or code, written in any form of programming language, including compiled or interpreted languages, or declarative or procedural languages, and may be deployed in any form, including deployed as a stand-alone program or deployed as a module, component, subroutine, or other means suitable for use in a computing environment.

As an example, executable instructions may, but do not necessarily correspond to, files in a file system and may be stored as part of a file holding other programs or data, for example, stored in one or more scripts in a Hyper Text Markup Language (HTML) document, stored in a single file that is specific to the program in question, or, stored in multiple collaborative files (for example, a file that stores one or more modules, subroutines, or portions of code).

It should be noted that "first", "second", and the like are used to distinguish similar objects and are not used to describe a specific order or sequence. In addition, the technical solutions described in the examples of the present disclosure may be combined arbitrarily as long as there is no conflict. The above descriptions are only examples of the present disclosure and are not intended to limit the scope of the present disclosure.

What is claimed is:

1. An operation method, comprising:
   sending, by a memory system comprising a memory controller, an index value, the index value being stored in the memory controller; and
   receiving, by a host system coupled to the memory system and comprising a host storage unit, the index value and obtaining serial port information corresponding to the index value based on the index value, the serial port information being stored in the host storage unit, and wherein
   a storage capacity occupied by the index value is smaller than a storage capacity occupied by the serial port information.

2. The operation method according to claim 1, wherein the obtaining serial port information corresponding to the index value based on the index value comprises:
   obtaining the serial port information corresponding to the index value based on the index value in combination with a mapping table, and wherein
   the mapping table comprises all serial port information and index values corresponding to all the serial port information, and the mapping table is stored in the host storage unit.

3. The operation method according to claim 2, wherein the memory system further comprises a memory device coupled to the memory controller, and
   the operation method further comprises:
      before sending the index value by the memory system, obtaining, by the host system, all the serial port information in the memory device and setting the index values corresponding to all the serial port information; and
      establishing the mapping table based on all the serial port information and the index values corresponding to all the serial port information.

4. The operation method according to claim 3, wherein the index values correspond to the serial port information one-by-one.

5. The operation method according to claim 1, wherein the sending, by the memory system, an index value comprises:
   sending the index value when an abnormality occurs in the memory system.

6. The electronic device according to claim 1, wherein the index value is stored in a firmware of the memory controller, and wherein a storage capacity occupied by the firmware is proportional in size to the inex value.

7. An electronic device, comprising:
   a memory system comprising a memory controller and configured to:

send an index value, the index value being stored in the memory controller; and a host system coupled to the memory system, wherein the host system comprises a host storage unit and is configured to:
receive the index value and obtain corresponding serial port information based on the index value, the serial port information being stored in the host storage unit, and wherein
a storage capacity occupied by the index value is smaller than a storage capacity occupied by the serial port information.

8. The electronic device according to claim 7, wherein the host system is configured to:
obtain the serial port information corresponding to the index value based on the index value in combination with a mapping table, and wherein
the mapping table comprises all serial port information and index values corresponding to all the serial port information, and the mapping table is stored in the host storage unit.

9. The electronic device according to claim 8, wherein the memory system further comprises a memory device coupled to the memory controller, and
the host system is further configured to:
before sending the index value by the memory system, obtain all the serial port information in the memory device and set the index values corresponding to all the serial port information; and
establish the mapping table based on all the serial port information and the index values corresponding to all the serial port information.

10. The electronic device according to claim 9, wherein the index values correspond to the serial port information one-by-one.

11. The electronic device according to claim 7, wherein the memory system is further configured to:
send the index value when an abnormality occurs in the memory system.

12. A system, comprising:
a memory controller configured to:
send an index value, the index value being stored in the memory controller; and
a memory device coupled to the memory controller and configured to:
receive the index value and determine serial port information corresponding to the index value based on the index value; and
send the serial port information to the memory controller, the serial port information being stored in the memory device, wherein a storage capacity occupied by the index value is smaller than a storage capacity occupied by the serial port information, and wherein the memory controller is further configured to:
receive the serial port information; and
send the serial port information to a host system coupled to the system.

13. The system according to claim 12, wherein the memory device is configured to:
obtain the serial port information corresponding to the index value based on the index value in combination with a mapping table, and wherein
the mapping table comprises all serial port information and index values corresponding to all the serial port information, and the mapping table is stored in the memory device.

14. The system according to claim 12, wherein the system is configured to:
send the index value when an abnormality occurs in the system.

15. The system according to claim 12, further comprising a host system coupled to the memory system, wherein the host system comprises a host storage unit and is configured to:
receive the index value and obtain the serial port information based on the index value, the serial port information obtained by the host system being stored in the host storage unit.

16. The system according to claim 15, wherein the host system is configured to:
obtain the serial port information corresponding to the index value based on the index value in combination with a mapping table.

17. The system according to claim 16, wherein:
the mapping table comprises all serial port information and index values corresponding to all the serial port information, and the mapping table is stored in the host storage unit.

18. The system according to claim 17, wherein the host system is further configured to:
before sending the index value by the memory system, obtain all the serial port information in the memory device and set the index values corresponding to all the serial port information.

19. The system according to claim 18, wherein the host system is further configured to:
establish the mapping table based on all the serial port information and the index values corresponding to all the serial port information.

20. The system according to claim 19, wherein the index values correspond to the serial port information one-by-one.

* * * * *